Patented Apr. 26, 1932

1,855,293

UNITED STATES PATENT OFFICE

GEORG KRÄNZLEIN AND MARTIN CORELL, OF HOCHST-ON-THE-MAIN, GERMANY, ASSIGNORS TO GENERAL ANILINE WORKS, INC., OF NEW YORK, N. Y., A CORPORATION OF DELAWARE

HALOGEN-DIBENZPYRENEQUINONES AND PROCESS OF MAKING SAME

No Drawing. Application filed March 5, 1926, Serial No. 92,586, and in Germany March 14, 1925.

The present invention relates to 1.6-dihalogen-dibenzpyrene-5.10-quinones, and to a process of preparing the same.

We have found that the halogen-dibenzpyrenequinones of the above given general formula are obtainable by treating a 1.5-dibenzoyl-2.6-dihydroxynaphthalene, the manufacture of which is described in our co-pending application Ser. No. 92,585, filed March 5, 1926, with an agent which is capable of effecting an exchange of the two hydroxy groups for chlorine and at the same time the closure of the ring to the dibenzpyrenequinone. The halides of phosphorus, for instance, have proved to be suitable agents. It is advantageous to conduct the operation in such a manner that the dibenzoyldihydroxynaphthalene is suspended in a solvent and heated while adding, for instance, so much of phosphorus pentachloride as is necessary for effecting the exchange of the two hydroxy groups for halogen and the closing of the ring. There is first obtained a solution from which a well crystallized yellow intermediate-product soon separates which, after being isolated and heated in sulfuric acid of 66° Bé. strength to 80–90° C., is converted into the dichlordibenzpyrenequinone. The reaction most probably occurs according to the following equation:

ties as the non-substituted dibenzpyrenequinone. They form red vats from which cotton, after subsequent exposure to air, is dyed a yellow color. They are also intended to be used for the manufacture of some other dyestuffs of the dibenzpyrenequinone series.

The following example serves to illustrate our invention:

18 parts of 2.6-dihydroxy-1.5-dibenzoyl-naphthalene are suspended in 50 parts of chlorobenzene and 44 parts of phosphorus pentachloride is added thereto. Reaction occurs at once with heat and evolution of hydrochloric acid. When the reaction is complete, the mass is heated to 100–110° C. so that the whole is at first dissolved whereupon the yellow intermediate-product soon separates with repeated evolution of hydrochloric acid. This intermediate-product is filtered by suction, washed and dried. It is insoluble when introduced in the cold into sulfuric acid of 66° Bé. strength, but when heated therein to 80–90° C. it dissolves to a blue solution with a red hue. After the mixture has been agitated for a short time, it is poured on ice, filtered by suction and washed until neutral. After being dried, the 1.6-dichlor-3.4.8.9-dibenzpyrenequinone forms a yellow powder which crystallizes from nitrobenzene in yellow needles. The dyestuff dissolves in sulfuric acid to a pure violet solution. It dyes cotton from a red vat yellow tints.

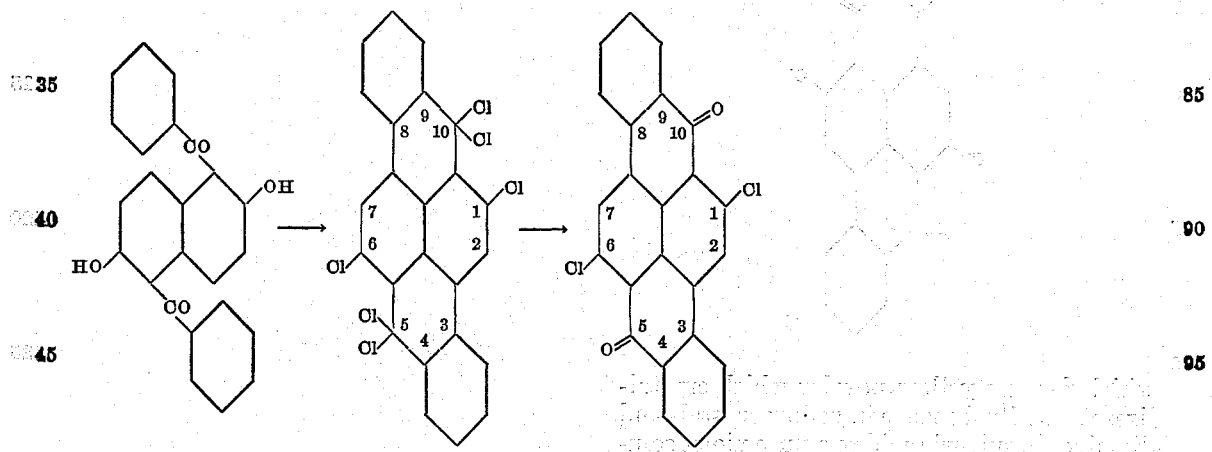

Our new homogeneous halogen-dibenzpyrenequinones possess similar tinctorial proper- Instead of 2.6-dihydroxy-1.5-dibenzoyl-naphthalene, its derivatives, substituted in the benzol residues, may be used and instead of phosphorus pentachloride other halides of phosphorus may be employed, such for instance as phosphorus pentabromide or a mixture of phosphorus oxychloride and phosphorus pentachloride.

We claim:

1. The process which comprises reacting 2.6-dihydroxy-1.5-dibenzoylnaphthalene with phosphorus pentachloride in the presence of chlorobenzene at a temperature of about 100–110° C., isolating the intermediate product thus obtained and treating it with sulfuric acid of about 66° Bé. strength at a temperature of about 80–90° C.

2. The process which comprises reacting 1.5-dibenzoyl-2.6-dihydroxynaphthalene with a halide of phosphorus and heating the resulting product with sulfuric acid.

3. In a process of preparing 1.6-dihalogen-dibenzpyrene-5.10-quinone the step which comprises reacting 1.5-dibenzoyl-2.6-dihydroxy-naphthalene with a halide of phosphorus.

4. In a process of preparing 1.6-dihalogen-dibenzpyrene-5.10-quinone the step which comprises reacting 1.5-dibenzoyl-2.6-dihydroxy-naphthalene with phosphorus pentachloride.

5. In a process of preparing 1.6-dihalogen-dibenzpyrene-5.10-quinone the step which comprises reacting 1.5-dibenzoyl-2.6-dihydroxy-naphthalene with a mixture of phosphorus pentachloride and phosphorus oxychloride.

6. As a new product, the 1.6-dichlor-3.4.8.9-dibenzpyrenequinone of the following formula:

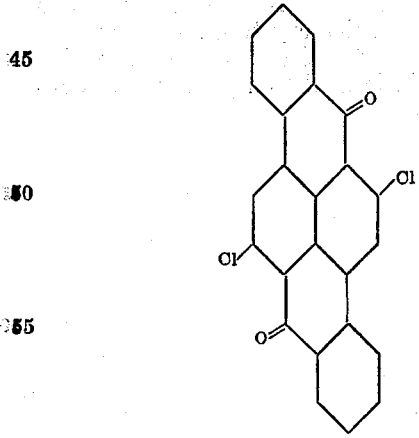

which forms a yellow powder which crystallizes from nitrobenzene in yellow crystals and dissolves in sulfuric acid to a pure violet solution.

7. As new products 1.6-dihalogen-dibenz-pyrene-5.10-quinones of the following formula:

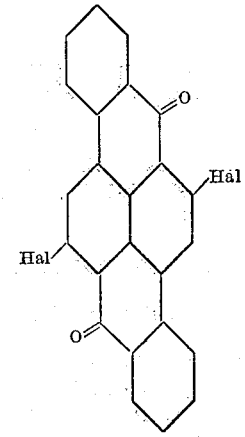

wherein Hal stands for halogen.

In testimony whereof, we affix our signatures.

GEORG KRÄNZLEIN.
MARTIN CORELL.